(12) United States Patent
Park et al.

(10) Patent No.: US 10,721,031 B2
(45) Date of Patent: Jul. 21, 2020

(54) METHOD OF TRANSMITTING AND RECEIVING TRANSMISSION BLOCK BASED ON CODE BLOCK GROUP

(71) Applicant: KT CORPORATION, Gyeonggi-do (KR)

(72) Inventors: Ki-Hyeon Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 16/128,748

(22) Filed: Sep. 12, 2018

(65) Prior Publication Data

US 2019/0089494 A1 Mar. 21, 2019

(30) Foreign Application Priority Data

Sep. 15, 2017 (KR) .................. 10-2017-0118409
May 18, 2018 (KR) .................. 10-2018-0056950

(51) Int. Cl.
*H04L 1/18* (2006.01)

(52) U.S. Cl.
CPC .......... *H04L 1/1861* (2013.01); *H04L 1/1809* (2013.01); *H04L 1/1812* (2013.01); *H04L 1/1864* (2013.01)

(58) Field of Classification Search
CPC ... H04L 1/1861; H04L 1/1809; H04L 1/1812; H04L 1/1864; H04L 1/1806; H04L 1/1607; H04L 1/0057
See application file for complete search history.

(56) References Cited

U.S. PATENT DOCUMENTS

2019/0052418 A1* 2/2019 Li .................. H04L 1/1819
2019/0245674 A1* 8/2019 Fehrenbach .......... H04L 1/1812
2019/0261355 A1* 8/2019 Lin ................. H04L 1/1887

OTHER PUBLICATIONS

Lenovo et al., "UL HARQ-ACK feedback for CBG-based retransmission", R1-1710604, 3GPP TSG RAN WG1 NR Ad-Hoc#2, Qingdao, P.R. China Jun. 27-30, 2017.
Nokia et al., "On CBG based transmissions", R1-1715547, 3GPP TSG-RAN WG1 NR AH #3, Nagoya, Japan, Sep. 18-21, 2017.

* cited by examiner

*Primary Examiner* — Walter J Divito
(74) *Attorney, Agent, or Firm* — IP Legal Services, LLC

(57) ABSTRACT

Disclosed is a method of transmitting and receiving a transmission block based on a code block group (CBG) in a 3GPP NR system. A method of a terminal may be provided for receiving a transmission block from a base station. The method may include receiving a transmission block composed of one or more code block groups (CBGs) from the base station, transmitting a HARQ ACK/NACK message for the transmission block to the base station, receiving a retransmission block configured based on the HARQ ACK/NACK message for the transmission block, and transmitting a HARQ ACK/NACK message for the retransmission block to the base station.

17 Claims, 4 Drawing Sheets

METHOD OF TRANSMITTING AND RECEIVING TRANSMISSION BLOCK BASED ON CODE BLOCK GROUP

CROSS REFERENCE TO RELATED APPLICATION

This application claims priority from Korean Patent Application No. 10-2017-0118409 & 10-2018-0056950, filed on Sep. 15, 2017 & May 18, 2018, which are hereby incorporated by reference for all purposes as if fully set forth herein.

BACKGROUND OF THE INVENTION

1. Field of the Invention

Embodiments relate to a method of transmitting and receiving a transmission block based on a code block group (CBG) in a 3rd Generation Partnership Project (3GPP) New Radio (NR) system, and more particularly, to a method of signaling a control message for a transmission block and a method of configuring a hybrid automatic repeat request (HARQ) feedback message for the CBG-based transmission block and a HARQ feedback message for a retransmission block.

2. Description of the Prior Art

The 3rd Generation Partnership Project (3GPP) recently approved a study item "Study on New Radio Access Technology" for studying next generation/5G radio access technology. Based on this study item, Radio Access Network Working Group 1 (RAN WG1) is discussing frame structures, channel coding and modulation, waveforms, and multiple access methods for new radio (NR). Compared to LTE/LTE-Advanced, it is required to design NR to satisfy various needs required for segmented and specified usage scenarios as well as improved data transmission rates.

As representative usage scenarios of NR, enhancement Mobile BroadBand (eMBB), massive Machine Type Communication (mMTC), and Ultra Reliable and Low Latency Communications (URLLC) were proposed. In order to satisfy requirements of each usage scenario, it is required to design a more flexible frame structure than that of the LTE/LTE-Advanced.

Meanwhile, a cyclic redundancy check (CRC) bit string having a predefined length is inserted into every unit information block in order to detect whether a received signal has an error in wireless communication. Thus, it is possible to perform a CRC check, and a corresponding block is determined as having no error when the check is successful and determined as having an error when the check fails.

For the typical 3GPP LTE, a 24-bit CRC is inserted into every transmission block (TB), which is a transmitter in the data channel, and different types of CRCs are inserted into individual code blocks constituting a TB. Thus, when the check fails in any of CRCs in a block received at a receiving end, a request is made through a HARQ-ACK/NACK procedure to retransmit the entire TB. For NR, there is an increasing need for a method of requesting retransmission of only a part having an error when a portion of the TB has an error, instead of requesting retransmission of the entire TB, to reduce resources needed for the retransmission.

SUMMARY OF THE INVENTION

The embodiments are intended to provide a method of signaling a control message for a transmission block based on a code block group (CBG) when transmitting and receiving the CBG-based transmission block and a detailed method of configuring a HARQ feedback message for the CBG-based transmission block and a HARQ feedback message for a retransmission block.

In order to solve the above-described problems, in accordance with an embodiment, a method of a terminal may be provided for receiving a transmission block from a base station. The method may include receiving a transmission block composed of one or more code block groups from the base station, transmitting a hybrid automatic repeat request (HARQ) ACK/NACK message for the transmission block to the base station, receiving a retransmission block configured based on the HARQ ACK/NACK message for the transmission block from the base station, and transmitting a HARQ ACK/NACK message for the retransmission block to the base station.

In accordance with another embodiment, a method of a base station may be provided for transmitting a transmission block to a terminal, the method including transmitting a transmission block composed of one or more code block groups to the terminal, receiving a HARQ ACK/NACK message for the transmission block from the terminal, transmitting a retransmission block configured based on the HARQ ACK/NACK message for the transmission block to the terminal, and receiving a HARQ ACK/NACK message for the retransmission block from the terminal.

In accordance with further another embodiment, a terminal may be provided for receiving a transmission block from a base station. The terminal may include a receiver configured to receive a transmission block composed of one or more code block groups from the base station and receive a retransmission block configured based on a HARQ ACK/NACK message for the transmission block from the base station and a transmitter configured to transmit the HARQ ACK/NACK message for the transmission block to the base station and transmit a HARQ ACK/NACK message for the retransmission block to the base station.

In accordance with still another embodiment, a base station may be provided for transmitting a transmission block to a terminal. The base station may include a transmitter configured to transmit a transmission block composed of one or more code block groups to the terminal and transmit a retransmission block configured based on a HARQ ACK/NACK message for the transmission block to the terminal and a receiver configured to receive the HARQ ACK/NACK message for the transmission block from the terminal and receive a HARQ ACK/NACK message for the retransmission block from the terminal.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
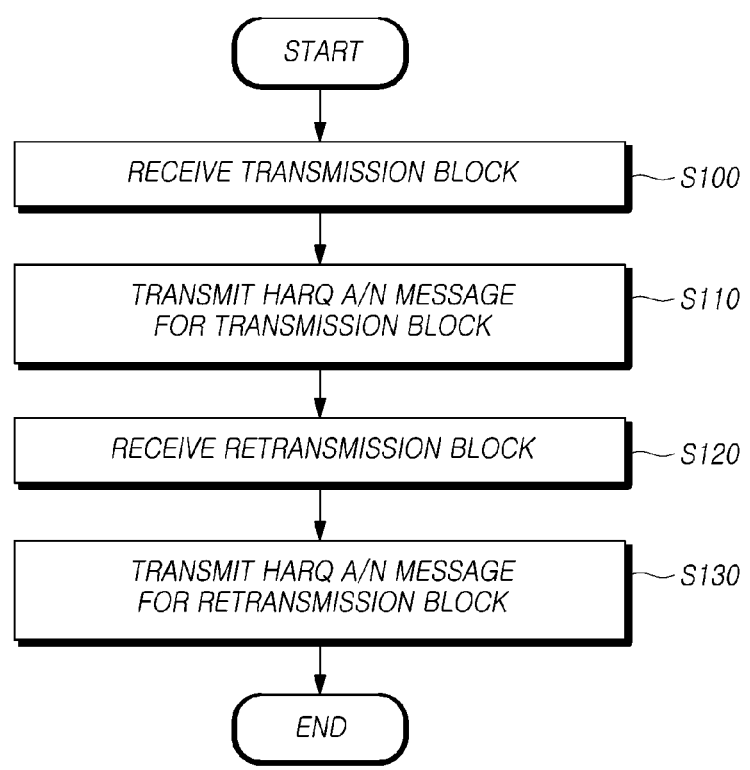
FIG. 1 is a flowchart showing a method of a terminal for receiving a transmission block (TB) from a base station according to an embodiment.

Hereinafter, some embodiments of the present disclosure will be described in detail with reference to the accompanying drawings. When assigning a reference number to each component shown in the drawings, it should be noted that the same components are given the same reference numbers even though they are shown in different drawings. Further, in the following description of the present disclosure, a detailed description of known functions and configurations incorporated herein will be omitted when it is determined that the description may make the subject matter of the present disclosure unclear.

In this specification, a wireless communication system refers to a system for to providing various communication services such as a voice service, a packet data service, and the like. The wireless communication system includes a user equipment (UE) and a base station (BS).

The UE may be an inclusive concept indicating a terminal utilized in wireless communication, including a mobile station (MS), a user terminal (UT), a subscriber station (SS), a wireless device, and the like in global systems for mobile communication (GSM) as well as a UE in wideband code division multiple access (WCDMA), long term evolution (LTE), high speed packet access (HSPA), International Mobile Telecommunications for 2020 and beyond (IMT-2020)(5G or New Radio), and the like.

The BS, or a cell, generally refers to a station that communicates with a UE and semantically covers a Node-B, an evolved Node-B (eNB), a gNode-B (gNB), a Low Power Node (LPN), a sector, a site, various forms of antennas, a base transceiver system (BTS), an access point, a point (e.g., a transmission point, a reception point, a transmission/reception point), a relay node, a megacell, a macrocell, a microcell, a picocell, a femtocell, a remote radio head (RRH), a radio unit (RU), a small cell, and the like.

There is a BS for controlling each of the above-mentioned various cells. Thus, the BS may be construed in the following two ways: (1) the BS may be an apparatus itself that provides the megacell, the macrocell, the microcell, the picocell, the femtocell, and the small cell in association with a wireless area; or (2) the BS may indicate the wireless area itself. In (1), all apparatuses that provide a predetermined wireless area and that are controlled by the same entity or all apparatuses that interact with one another to cooperatively configure the wireless area may be referred to as BSs. Based on the configuration type of the wireless area, the point, the transmission/reception point, the transmission point, the reception point, and the like may be examples of the BS. In (2), the wireless area itself where signals are received or transmitted from the perspective of the UE or from the stance of a neighboring BS may be referred to as a BS.

In this specification, the cell may refer to the coverage of a signal transmitted from the transmission/reception point (or the transmission point), a component carrier having the coverage of a signal transmitted from a transmission/reception point, or a transmission/reception point itself.

In this specification, the UE and the BS are used as two (uplink or downlink) inclusive transceiving subjects to embody the technology or technical concepts described in the specification and may not be limited to predetermined terms or words.

Here, uplink (UL) refers to a scheme in which a UE transmits and receives data to and from the BS, and downlink (DL) refers to a scheme in which the BS transmits and receives data to and from the UE.

UL transmission and DL transmission may be performed using one of i) a time division duplex (TDD) scheme in which the transmission is performed by means of different times, ii) a frequency division duplex (FDD) scheme in which the transmission is performed by means of different frequencies, and iii) a mixed scheme of the TDD scheme and the FDD scheme.

Also, in the wireless communication system, a specification is formed by configuring the UL and the DL based on a single carrier or a pair of carriers. The UL and the DL may carry control information through a control channel such as a Physical Downlink Control Channel (PDCCH) and a Physical Uplink Control Channel (PUCCH) and may carry data through a data channel such as a Physical Downlink Shared Channel (PDSCH) and a Physical Uplink Shared Channel (PUSCH).

The DL may refer to communication or a communication path from a multi-transmission/reception point to a terminal, and the UL may refer to communication or a communication path from a terminal to a multi-transmission/reception point. In the DL, a transmitter may be a part of the multi-transmission/reception point, and a receiver may be a part of the terminal. In the UL, the transmitter may be a part of the terminal, and a receiver may be a part of the multi-transmission/reception point.

Hereinafter, signal transmission and reception through a channel such as PUCCH, PUSCH, PDCCH, and PDSCH may be expressed as "PUCCH, PUSCH, PDCCH, and PDSCH are transmitted or received."

Meanwhile, high layer signaling, which will be described below, includes Radio Resource Control (RRC) signaling that carries RRC information including RRC parameters.

The BS performs DL transmission to terminals. The BS may transmit the PDCCH for carrying DL control information such as scheduling needed to receive a DL data channel, which is a primary physical channel for a unicast transmission, and also carrying scheduling approval information for transmission through a UL data channel. Hereinafter, transmission and reception of a signal through each channel will be described as transmission and reception of a corresponding channel.

There are no restrictions on multiple access schemes applied to wireless communication systems. Various multiple access schemes, such as Time Division Multiple Access (TDMA), Frequency Division Multiple Access (FDMA), Code Division Multiple Access (CDMA), Orthogonal Frequency Division Multiple Access (OFDMA), Non-Orthogonal Multiple Access (NOMA), OFDM-TDMA, OFDM-FDMA, and OFDM-CDMA, may be used. Here, NOMA includes Sparse Code Multiple Access (SCMA), Low Density Spreading (LDS), and the like.

An embodiment of the present disclosure is applicable to resource allocation in an asynchronous wireless communication scheme that evolves to LTE/LTE-Advanced and IMT-2020 via GSM, WCDMA, and HSPA and in a synchronous wireless communication scheme that evolves to CDMA, CDMA-2000, and UMB.

In this specification, a machine type communication (MTC) terminal may refer to a terminal that supports low cost (or low complexity), a terminal that supports coverage enhancement, or the like. Alternatively, in this specification, the MTC terminal may refer to a terminal that is defined in a predetermined category for supporting low cost (or low complexity) and/or coverage enhancement.

In other words, in this specification, the MTC terminal may refer to a newly defined third generation partnership project (3GPP) Release 13 low cost (or low complexity) UE category/type, which executes LTE-based MTC-related operations. Alternatively, in this specification, the MTC terminal may refer to a UE category/type that is defined in or before 3GPP Release-12 that supports the enhanced coverage in comparison with the existing LTE coverage or supports low power consumption or may refer to a newly defined Release 13 low cost (or low complexity) UE category/type. Alternatively, the MTC terminal may refer to a further enhanced MTC terminal, which is defined in Release-14.

In this specification, a NarrowBand Internet of Things (NB-IoT) terminal refers to a terminal that supports radio access for cellular IoT. The objectives of the NB-loT technology include improved indoor coverage, large-scale support for low-rate terminals, low latency sensitivity, low terminal cost, low power consumption, and an optimized network structure.

As a representative usage scenario in new radio (NR), which is recently being discussed in the 3GPP, enhanced Mobile BroadBand (eMBB), massive Machine Type Communication (mMTC), and Ultra Reliable and Low Latency Communication (URLLC) have been proposed.

In this specification, a frequency, a frame, a subframe, resources, resource blocks, a region, a band, a sub-band, a control channel, a data channel, a synchronization signal, various kinds of reference signals, various kinds of signals, and various kinds of messages which are associated with NR may be interpreted with various meanings in the past, at present, or in the future.

In LTE, which is a related wireless communication technology, a transmission block (also referred to as a transport block and hereinafter referred to as TB), which is a transmitter corresponding a single scheduling, may be generally composed of several code blocks (CBs).

In NR, several CBs constitute one code block group (hereinafter referred to as CBG), and several CBGs constitute one TB. Accordingly, the NR may support CB-CBG-TB-type CBG-based transmission scheme, as well as CB-TB-type TB-based transmission scheme like the legacy LTE.

In the legacy LTE, it is defined to allocate one bit per each TB as a HARQ ACK/NACK message for determining whether one TB has an error and feeding back a result of the determination. Accordingly, a receiving end should request retransmission of the entire TB although an error occurs in some CBs of the TB.

On the other hand, for CBG-based transmission, it is defined to allocate one bit per each CBG as a HARQ ACK/NACK (A/N) message. Accordingly, when there are fewer CBs in which an error occurs, more efficient retransmission management may be performed.

When such a CBG-based transmission scheme is introduced, a plurality of CBs present in one TB may be classified and grouped into a predetermined number of CBGs. Here, a setting value of the number of CBGs may be signaled through high RRC signaling, and the number of CBGs in a corresponding TB may be finally determined depending on the number of CBs that are actually present in the TB. In this case, the number of CBs in each CBG may be defined as uniformly as possible.

The CBG-based transmission scheme enables efficient retransmission by specifying a block having an error and then retransmitting the block, but may have various issues due to an increase in length of a HARQ A/N message.

In particular, each TB has a different number of CBGs, and thus the number of efficient HARQ A/N bits changes. This change may affect reception performance by changing the number of resources needed for a control message in which HARQ feedback information is to be actually included, to complicate the system and increase uncertainty in length of the control message.

In order to solve this problem, a semi-static codebook has been introduced. The semi-static codebook is a method of unconditionally fixing the number of HARQ A/N bits to a specific number irrespective of the actual number of CBGs in the corresponding TB and thus fixing the format of the control message. However, when the set value is large, a certain length should be used unconditionally even when a TB having a small number of CBGs is used.

On the other hand, according to a method utilizing a dynamic codebook, which is an opposite concept to the semi-static codebook, it is possible to complement the disadvantages in terms of resource efficiency by changing the number of HARQ A/B bits to a minimum number required at that time before the HARQ A/B bits are used, but it is not possible to avoid an increase in complexity of the control message and a reduction in performance.

Depending on need or situation, both of the two modes may be supported so that a BS can alternate between the two modes.

The present disclosure introduces a method for efficiently operating a HARQ A/N feedback message in a codeword block group transmission mode is provided. To this end, a method may be provided for distinguishing between a case using a semi-static codebook mode and a case using a dynamic codebook mode, and a method may be provided for operating an actual feedback message in each of the modes according to embodiments.

Furthermore, the present disclosure may provide embodiments of (1) a method of a BS for delivering, to a EU, which mode is to be used; (2) a HARQ A/N feedback bit number (HFN) setting method upon transmission in the semi-static codebook mode; and (3) an HFN setting method upon transmission in the dynamic codebook mode.

It should be noted that terms used to describe this embodiment are replaced with other terms having the same meanings and are intended to explain the role of an actual object and not to limit the scope of the technology.

Prior to describing the operation of the present disclosure, a TB transmission method based on a code block group (CBG) defined in the NR will be described.

In NR, it is possible to operate a TB having a much larger size by introducing a much larger bandwidth and a technology such as slot aggregation, in comparison to the legacy LTE. However, since CBs constituting the TB each have an information bit size limited to up to 8448, a large TB may be composed of a plurality of sets of CBs.

Such a TB may be logically divided into a number of CBGs that are determined through high layer signaling. For example, when the number of CBGs is pre-determined through high layer signaling and the number of CBs in a corresponding TB, the TB may be configured to have four CBGs, each of which has two CBs that do not overlap with each other.

In this case, when a corresponding TB has less than four CBs, for example, only two CBs, the TB has only two CBGs. However, when a corresponding TB has four or more CBGs, the number of CBGs is always four. In this case, when the number of CBs does not divide by four, for example, is six, the CBs may be distributed as evenly as possible. For example, the first two CBGs may have two CBs, and the other CBGs may have one CB.

That is, when the number of CBGs of a corresponding TB is represented as G (here, G is a natural number), the number of CBs in the TB is represented as C (here, C is a natural number), and the maximum number of CBGs that the TB can have (as an example, this value may be delivered to a terminal through high layer signaling) is MAX_CBG, G may be determined as min (C, MAX_CBG). Also, when the number of CBs in the TB is C and the number of CBGs of the TB is G, among a total of G CBGs, the first (C mod G) CBGs may be composed of $\lceil C/G \rceil$ CBs, and the other (G−(C mod G)) CBGs may be composed of $\lfloor C/G \rfloor$ CBs. When such a TB is transmitted to a receiving end, the receiving end may determine whether each CB of the TB has an error by performing CRC check on the CBs. Also, when one of CBs in a CBG is determined as having an error, a HARQ A/N message bit corresponding to the CBG is set to NACK, included in a feedback control message, and then transmitted.

For example, when the number of CBs in a corresponding TB is eight and when the CBs are indexed with 1 to 8, four CBGs may be configured to each respectively include CB1 and CB2, CB3 and CB4, CB5 and CB6, and CB7 and CB8. In this case, when reception of CH1, CH5, and CH6 fails, a feedback message of the receiving end may be [NACK, ACK, NACK, ACK].

Subsequently, only CH1, CH2, CH5, and CH6 are retransmitted, and the configuration of the CBGs is not changed. Thus, a feedback message for the CBGs retransmitted by the receiving end needs two bits. In this case, the HARQ A/N message may consist of 2+α bits when the dynamic codebook is used and may consist of 4+α bits when the semi-static codebook is used.

Here, α refers to a HARQ AB bit that may be additionally included and used for other purposes such as a TB-HARQ bit other than a bit corresponding to a CBG. When such a function is not provided, α may be set to zero.

Meanwhile, CRC check may be successful for each CB of the TB but may fail for the entire TB. This is because a CRC for each CB and a CRC for the entire TB exist separately. At this time, it is possible to know whether transmission of the TB has failed, but it is not possible to know of which CB reception has failed.

In this case, in order to make an instruction to retransmit the entire TB, the receiving end may configure all the HARQ A/N message bits as NACK bits.

In order to describe the following embodiments, terms are defined as follows:

ICN (indicated CBG number): number of CBGs that is preset through RRC;

TCN (TB's CBG number): number of CBGs in TB first;

RCN (retransmitted block's CBG number): number of CBGs in retransmitted block; and HFN (HARQ A/N feedback bit number): number of HARQ A/N feedback message for specific TB.

Methods of a UE for receiving a TB from a BS and methods of a BS for transmitting a TB to a UE according to embodiments will be described below in detail.

The following embodiments may be applied individually or in combination.

Embodiment 1: Method of Delivering which Mode is to be Used

This embodiment provides three methods.

Embodiment 1-1

This embodiment relates to a method of using the semi-static codebook mode when ICN is either less than or equal to (or is less than) a specific threshold value X and using the dynamic codebook mode when ICN is greater than (or is either greater than or equal to) X.

The threshold value X may be defined in a predetermined standard specification, may be determined depending on CQI/MCS setting values, a transmission mode, a sub-carrier value and bandwidth, the number of CAs, the number of codewords (CWs), or the like, or may be preset through RRC signaling. It should be noted that a description of the following method is limited to a case classified by whether ICN is either less than or equal to X, or greater than X, but the case is different from a case classified by whether ICN is less than X, or either greater than or equal to X by just 1 and the cases have the same spirit.

Embodiment 1-2

This embodiment is similar to, but different from, Embodiment 1-1, in that the dynamic codebook mode is to be used when ICN is less than or equal to X and the semi-static codebook mode is to be used when ICN is greater than X.

Embodiment 1-3

This embodiment relates to a method of mixing the semi-static codebook mode with the dynamic codebook mode, that is, a method of performing sectioning according to the current transmitted TCN/RCN and determining the maximum value of a specific section as HFN when TCN/RCN is inside the specific section.

For example, it is assumed that the sectioning is performed on the basis of 3, 6, 9, and 12. Under this assumption, i) HFN is fixed to 3+α when TCN/RCN ranges from 1 to 3, ii) HFN is fixed to 6+α when TCN/RCN ranges from 4 to 6, iii) HFN is fixed to 9+α when TCN/RCN ranges from 7 to 9, and iv) HFN is fixed to 12+α when TCN/RCN ranges from 10 to 12. The sections define up to the maximum length of CBGs allowed in the specification and do not necessarily have to be the same distance.

Embodiment 1-3-1

This embodiment is similar to Embodiment 1-3, but relates to a method of perform sectioning according to the currently transmitted TCN/RCN and determining the same value as TCN/RCN as HFN when TCN/RCN exceeds a specific section.

For example, it is assumed that the sectioning is performed on the basis of 3, 6, 9, and 12. Under this assumption, i) HFN is fixed to 3+α when TCN/RCN ranges from 1 to 3, ii) HFN is fixed to 6+α when TCN/RCN ranges from 4 to 6, iii) HFN is fixed to 9+α when TCN/RCN ranges from 7 to 9, iv) HFN is fixed to 12+α when TCN/RCN ranges from 10 to 12, and v) HFN is fixed to 13+α when TCN/RCN exceeds 12, e.g., when TCN/RCN is equal to 13.

Embodiment 1-3-2

This embodiment is also similar to Embodiment 1-3, but relates to a method of perform sectioning according to the currently transmitted TCN/RCN and determining the same value as TCN/RCN falls below a specific section. Similarly to Embodiment 1-3, the sections define up to the maximum length of CBGs allowed in the specification.

For example, it is assumed that the sectioning is performed on the basis of 3, 6, 9, and 12. Under this assumption, i) HFN is fixed to TCN/RCN+α when TCN/RCN ranges from 1 to 3, ii) HFN is fixed to 6+α when TCN/RCN ranges from 4 to 6, iii) HFN is fixed to 9+α when TCN/RCN ranges from 7 to 9, and iv) HFN is fixed to 12+α when to TCN/RCN ranges from 10 to 12.

Embodiment 1-3-3

This embodiment relates to a method of simultaneously using Embodiments 1-3-1 and 1-3-2. For example, it is assumed that the sectioning is performed on the basis of 3, 6, 9, and 12. Under this assumption, i) HFN is fixed to TCN/RCN+α when TCN/RCN ranges from 1 to 3, ii) HFN is fixed to 6+α when TCN/RCN ranges from 4 to 6, iii) HFN is fixed to 9+α when TCN/RCN ranges from 7 to 9, iv) HFN is fixed to 12+α when TCN/RCN ranges from 10 to 12, and v) HFN is fixed to 13+α when TCN/RCN exceeds 12, e.g., when TCN/RCN is equal to 13.

Embodiment 2: Method of Setting HFN During Transmission in the Semi-Static Codebook TCN may be smaller than, but cannot be larger than, ICN. In each case, for initial transmission and retransmission, HFN may be determined as follows.

Embodiment 2-1

HFNs for both of initial transmission and retransmission are unconditionally set to ICN+α irrespective of TCN. Redundant bits mapped to no code block groups may be left as meaningless values and may be filled with repeated significant bits.

Embodiment 2-2

HFNs for both of initial transmission and retransmission are set to TCN+α.

Embodiment 3: Method of Setting HFN During Transmission in the Dynamic Codebook Mode In the dynamic codebook mode, the initial transmission and the retransmission may have different lengths, in which case HFN for the initial transmission and the retransmission may be determined as follows.

Embodiment 3-1

HFNs for both of initial transmission and retransmission are set to TCN+α, similarly to Embodiment 2-2. When comparing Embodiment 2-2 to Embodiment 3-1, the embodiments have a difference with respect to whether the same method is applied in the semi-static codebook or in the dynamic codebook. Accordingly, Embodiment 2-2 and Embodiment 3-1 may be applied simultaneously.

Embodiment 3-2

HFN of initially transmitted TB is set to TCN+α, and HFN of retransmitted block corresponding to the TB is set to RCN+α.

Embodiment 3-3

When Embodiment 1-1 is applied, HFN of initially transmitted TB is set to TCN+α when TCN is greater than a threshold value X, and then a corresponding HFN is set to X+α when RCN of the corresponding TB is less than or equal to the threshold value X. When TCN of initially transmitted TB is less than or equal to the threshold value X, HFNs of the initially transmitted TB and retransmitted block may be set to X+α.

Through the method provided in this embodiment, it is possible to efficiently operate a HARQ A/N feedback message in the block code transmission mode. Thus, it is also possible to distinguish between a case using the semi-static codebook mode and a case using the dynamic codebook mode and efficiently setting an actual feedback message in each of the modes.

FIG. 1 is a flowchart showing a method of a terminal for receiving a transmission block from a BS according to an embodiment.

Referring to FIG. 1, first, the terminal may receive a transmission block composed of one or more code block groups (CBGs) from the BS (S100).

Also, the terminal may transmit a HARQ ACK/NACK message for the transmission block received in S100 to the BS (S110).

Also, the terminal may receive, from the BS, a retransmission block configured based on the HARQ ACK/NACK message transmitted by the BS in S110 (S120).

Also, the terminal may transmit a HARQ ACK/NACK message for the retransmission block received in S120 to the BS (S130).

In this case, as an example, each of the number of bits of the HARQ ACK/NACK message for the transmission block and the number of bits of the HARQ ACK/NACK message for the retransmission block may be a fixed value N (here, N is a natural number).

That is, in the above-described semi-static codebook mode, each of the HARQ ACK/NACK message for the transmission block and the HARQ ACK/NACK message for the retransmission block may include a fixed number of bits, irrespective of the number of code block groups constituting the HARQ ACK/NACK message. In this case, the specific value N may be transmitted from the BS to the terminal through high layer signaling (e.g., RRC signaling).

In this case, when the number of code block groups constituting the transmission block or the retransmission block is K (here, K is a natural number), the value K is less than or equal to the value N. That is, since bits mapped to each of the code block groups constituting the transmission block or the retransmission block should be present in the HARQ ACK/NACK message, the number N of bits of the HARQ ACK/NACK message for the transmission block or the retransmission block should be greater than or equal to K Each K bit mapped to a corresponding code block group in the HARQ ACK/NACK message for the transmission block or the retransmission block may indicate, as an ACK or NACK bit, whether to perform retransmission to the mapped code block group.

When the value N is equal to the value K, N bits may be mapped to different code block groups, and each bit may indicate whether to perform retransmission to a specific code block group.

When the value N is greater than the value K, the number of bits of the HARQ ACK/NACK message for the transmission block may be greater than the number of code block groups constituting the transmission block, or the number of bits of the HARQ ACK/NACK message for the retransmission block may be greater than the number of code blocks groups constituting the retransmission block.

In this case, there may not be code block groups mapped to some bits of the HARQ ACK/NACK message for the transmission block or the HARQ ACK/NACK message for the retransmission block.

In this case, among the N bits of the HARQ ACK/NACK message for the transmission block or the HARQ ACK/NACK message for the retransmission block, the first K bits may be mapped to different code block groups, and all the last (N−K) bits mapped to no code block groups may be set to either NACK bits or ACK bits.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set by repeating a configuration pattern of the first K bits.

For example, when the HARQ ACK/NACK message consists of eight bits (i.e., N=8) and the first two bits (i.e., K=2) are set to ACK and NACK, the last six bits (i.e., N−K=8-2=6) may be set to ACK, NACK, ACK, NACK, ACK, and NACK, which is obtained by repeating a pattern of ACK and NACK It is assumed that the HARQ ACK/NACK message consists of eight bits (i.e., N=8). Under this assumption, the last seven bits (i.e., N−K=8−1=7) may be set to ACKs when the first bit (i.e., K=1) is set to ACK, and the last seven bits may be set to NACKs when the first bit (i.e., K=1) is set to NACK. That is, when K=1, all the bits of the HARQ ACK/NACK message may be set to the same value as the first bit.

In this case, when DL control information for scheduling a DL data channel through which the transmission block or the retransmission block is to be transmitted has a predetermined first DCI format, the last (N−K) bits mapped to no code block groups may be set by repeating a pattern of the first K bits.

Also, as another example, each of the number of bits of the HARQ ACK/NACK message for the transmission block and the number of bits of the HARQ ACK/NACK message for the retransmission block may be set to M (here, M is a natural number). In this case, M may be determined as the number of code block groups constituting the transmission block.

That is, in the above-described dynamic codebook mode, the number of bits of the HARQ ACK/NACK message may vary depending on the number of code block groups of the transmission block, but the number of bits of the HARQ ACK/NACK message for the transmission block may be set equal to the number of bits of the HARQ ACK/NACK message for the retransmission block.

Figure 2:
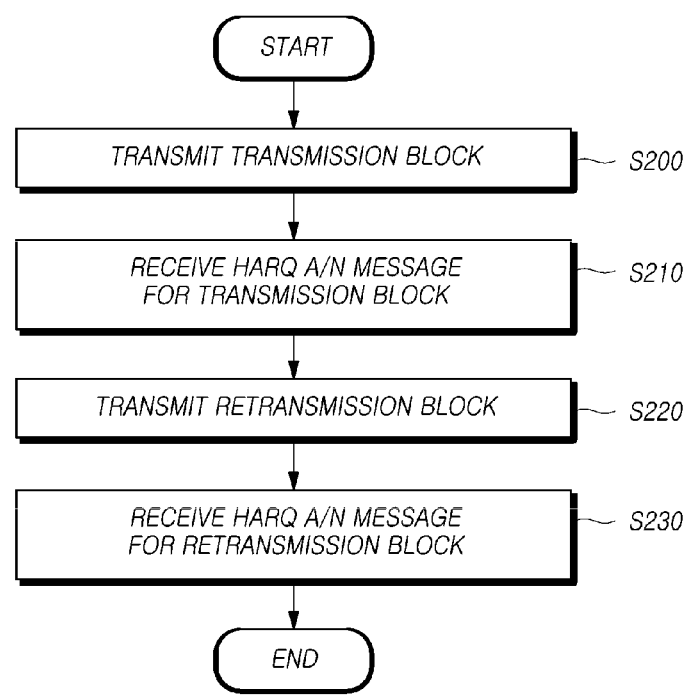
FIG. 2 is a flowchart showing a method of a base station for transmitting a transfer block to a terminal according to an embodiment.

FIG. 2 is a flowchart for showing a method of a BS for transmitting a transmission block to a terminal according to an embodiment.

Referring to FIG. 2, first, the BS may transmit a transmission block composed of one or more CBGs to the terminal (S200).

Also, the BS may receive a HARQ ACK/NACK message for the transmission block transmitted in S200 from the terminal (S210).

Also, the BS may configure a retransmission block on the basis of the HARQ ACK/NACK message received in S210 and transmit the retransmission block to the terminal (S220).

Also, the BS may receive a HARQ ACK/NACK message for the retransmission block transmitted in S220 from the terminal (S230).

In this case, as an example, each of the number of bits of the HARQ ACK/NACK message for the transmission block and the number of bits of the HARQ ACK/NACK message for the retransmission block may be a fixed value N (here, N is a natural number).

That is, in the above-described semi-static codebook mode, each of the HARQ ACK/NACK message for the transmission block and the HARQ ACK/NACK message for the retransmission block may consist of a fixed number of bits, irrespective of the number of code block groups constituting the HARQ ACK/NACK message. In this case, the specific value N may be transmitted from the BS to the terminal through high layer signaling (e.g., RRC signaling).

In this case, when the number of code block groups constituting the transmission block or the retransmission block is K (here, K is a natural number), the value K is less than or equal to the value N. That is, since bits mapped to each of the code block groups constituting the transmission block or the retransmission block should be present in the HARQ ACK/NACK message, the number N of bits of the HARQ ACK/NACK message for the transmission block or the retransmission block should be greater than or equal to K Each of the K bits mapped to each of the code block groups in the HARQ ACK/NACK message for the transmission block or the retransmission block may indicate, as an ACK or NACK bit, whether to perform retransmission to the mapped code block group.

When the value N is equal to the value K, N bits may be mapped to different code block groups, and each bit may indicate whether to perform retransmission to a specific code block group.

When the value N is greater than the value K, the number of bits of the HARQ ACK/NACK message for the transmission block may be greater than the number of code block groups constituting the transmission block, or the number of bits of the HARQ ACK/NACK message for the retransmission block may be greater than the number of code blocks groups constituting the retransmission block.

In this case, there may not be code block groups mapped to some bits of the HARQ ACK/NACK message for the transmission block or the HARQ ACK/NACK message for the retransmission block.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set to either NACK bits or ACK bits.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set by repeating a configuration pattern of the first K bits.

For example, when the HARQ ACK/NACK message consists of eight bits (i.e., N=8) and the first two bits (i.e., K=2) are set to ACK and NACK, the last six bits (i.e., N−K=8−2=6) may be set to ACK, NACK, ACK, NACK, ACK, and NACK, which is obtained by repeating a pattern of ACK and NACK It is assumed that the HARQ AKC NACK message consists of eight bits (i.e., N=8). Under this assumption, the last seven bits (i.e., N−K=8−1=7) may be set to ACKs when the first bit (i.e., K=1) is set to ACK, and the last seven bits may be set to NACKs when the first bit (i.e., K=1) is set to NACK That is, when K=1, all the bits of the HARQ ACK/NACK message may be set to the same value as the first bit.

In this case, when DL control information for scheduling a DL data channel through which the transmission block or the retransmission block is to be transmitted has a predetermined first DCI format, the last (N−K) bits mapped to no code block groups may be set by repeating a pattern of the first K bits. Also, as another example, each of the number of bits of the HARQ ACK/NACK message for the transmission block and the number of bits of the HARQ ACK/NACK message for the retransmission block may be set to M (here, M is a natural number). In this case, M may be determined as the number of code block groups constituting the transmission block.

That is, in the above-described dynamic codebook mode, the number of bits of the HARQ ACK/NACK message may vary depending on the number of code block groups of the transmission block, but the number of bits of the HARQ ACK/NACK message for the transmission block may be set equal to the number of bits of the HARQ ACK/NACK message for the retransmission block.

Figure 3:
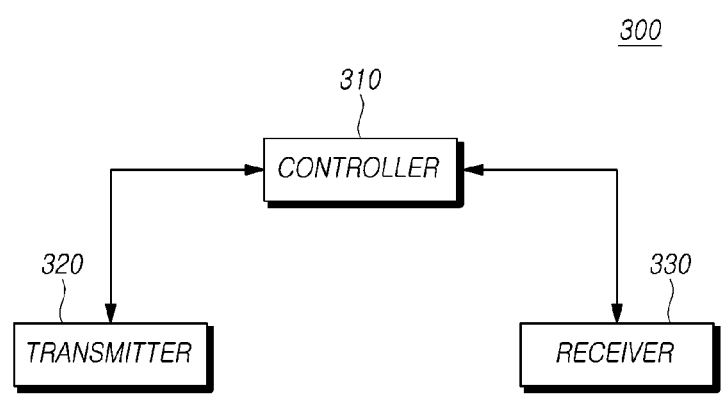
FIG. 3 is a diagram illustrating a base station according to embodiments.

FIG. 3 is a diagram illustrating a BS according to embodiments.

Referring to FIG. 3, the BS 300 includes a controller 310, a transmitter 320, and a receiver 330.

The controller 310 may control operations of the BS 300 to transmit a transmission block to a terminal.

The transmitter 320 and the receiver 330 are used to transmit or receive a signal, a message, or data needed to implement the above-described embodiments of the present disclosure to or from the terminal.

In detail, the transmitter 320 may transmit a transmission block composed of one or more code block groups to the terminal and also may transmit a retransmission block configured based on a HARQ ACK/NACK message for the transmission block to the terminal.

Also, the receiver 330 may receive the HARQ ACK/NACK message for the transmission block from the terminal and also may receive a HARQ ACK/NACK message for the retransmission block from the terminal.

In this case, as an example, each of the number of bits of the HARQ ACK/NACK message for the transmission block and the number of bits of the HARQ ACK/NACK message for the retransmission block may be a fixed value N (here, N is a natural number).

That is, in the above-described semi-static codebook mode, each of the HARQ ACK/NACK message for the transmission block and the HARQ ACK/NACK message for the retransmission block may consist of a fixed number of bits, irrespective of the number of code block groups constituting the HARQ ACK/NACK message. In this case, the specific value N may be transmitted from the BS 300 to the terminal through high layer signaling (e.g., RRC signaling).

In this case, when the number of code block groups constituting the transmission block or the retransmission block is K (here, K is a natural number), the value K is less than or equal to the value N. That is, since bits mapped to each of the code block groups constituting the transmission block or the retransmission block should be present in the HARQ ACK/NACK message, the number N of bits of the HARQ ACK/NACK message for the transmission block or the retransmission block should be greater than or equal to K Each of the K bits mapped to each of the code block groups in the HARQ ACK/NACK message for the transmission block or the retransmission block may indicate, as an ACK or NACK bit, whether to perform retransmission to the mapped code block group.

When the value N is equal to the value K, N bits may be mapped to different code block groups, and each bit may indicate whether to perform retransmission to a specific code block group.

When the value N is greater than the value K, the number of bits of the HARQ ACK/NACK message for the transmission block may be greater than the number of code block groups constituting the transmission block, or the number of bits of the HARQ ACK/NACK message for the retransmission block may be greater than the number of code blocks groups constituting the retransmission block.

In this case, there may not be code block groups mapped to some bits of the HARQ ACK/NACK message for the transmission block or the HARQ ACK/NACK message for the retransmission block.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set to either NACK bits or ACK bits.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set by repeating a configuration pattern of the first K bits.

For example, when the HARQ ACK/NACK message consists of eight bits (i.e., N=8) and the first two bits (i.e., K=2) are set to ACK and NACK, the last six bits (i.e., N−K=8−2=6) may be set to ACK, NACK, ACK, NACK, ACK, and NACK, which is obtained by repeating a pattern of ACK and NACK It is assumed that the HARQ AKC NACK message consists of eight bits (i.e., N=8). Under this assumption, the last seven bits (i.e., N−K=8−1=7) may be set to ACKs when the first bit (i.e., K=1) is set to ACK and may be set to NACKs when the first bit (i.e., K=1) is set to NACK. That is, when K=1, all the bits of the HARQ ACK/NACK message may be set to the same value as the first bit.

In this case, when DL control information for scheduling a DL data channel through which the transmission block or the retransmission block is to be transmitted has a predetermined first DCI format, the last (N−K) bits mapped to no code block groups may be set by repeating a pattern of the first K bits. Also, as another example, each of the number of bits of the HARQ ACK/NACK message for the transmission block and the number of bits of the HARQ ACK/NACK message for the retransmission block may be set to M (here, M is a natural number). In this case, M may be determined as the number of code block groups constituting the transmission block.

That is, in the above-described dynamic codebook mode, the number of bits of the HARQ ACK/NACK message may vary depending on the number of code block groups of the transmission block, but the number of bits of the HARQ ACK/NACK message for the transmission block may be set equal to the number of bits of the HARQ ACK/NACK message for the retransmission block.

Figure 4:
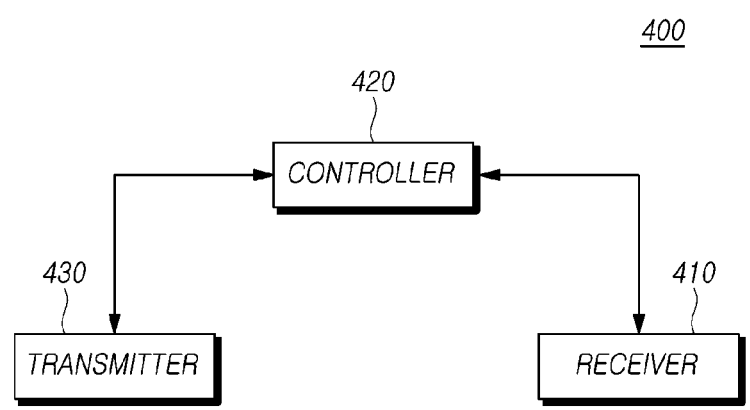
FIG. 4 is a diagram illustrating a terminal according to embodiments.

FIG. 4 is a diagram illustrating a terminal according to embodiments.

Referring to FIG. 4, a terminal 400 includes a receiver 410, a controller 420, and a transmitter 430.

The receiver 410 may receive a transmission block composed of one or more code block groups from a BS and also may receive a retransmission block configured based on a HARQ ACK/NACK message for the transmission block from the BS.

Also, the transmitter 430 may transmit the HARQ ACK/NACK message for the transmission block to the BS and also may transmit a HARQ ACK/NACK message for the retransmission block to the BS.

In this case, as an example, each of the number of bits of the HARQ ACK/NACK message for the transmission block and the number of bits of the HARQ ACK/NACK message for the retransmission block may be a fixed value N (here, N is a natural number).

That is, in the above-described semi-static codebook mode, each of the HARQ ACK/NACK message for the transmission block and the HARQ ACK/NACK message for the retransmission block may consist of a fixed number of bits, irrespective of the number of code block groups constituting the HARQ ACK/NACK message. In this case, the specific value N may be transmitted from the BS to the terminal 400 through high layer signaling (e.g., RRC signaling).

In this case, when the number of code block groups constituting the transmission block or the retransmission block is K (here, K is a natural number), the value K is less than or equal to the value N. That is, since bits mapped to each of the code block groups constituting the transmission block or the retransmission block should be present in the HARQ ACK/NACK message, the number N of bits of the HARQ ACK/NACK message for the transmission block or the retransmission block should be greater than or equal to K Each of the K bits mapped to each of the code block groups in the HARQ ACK/NACK message for the transmission block or the retransmission block may indicate, as an ACK or NACK bit, whether to perform retransmission to the mapped code block group.

When the value N is equal to the value K, N bits may be mapped to different code block groups, and each bit may indicate whether to perform retransmission to a specific code block group.

When the value N is greater than the value K, the number of bits of the HARQ ACK/NACK message for the transmission block may be greater than the number of code block groups constituting the transmission block, or the number of bits of the HARQ ACK/NACK message for the retransmission block may be greater than the number of code blocks groups constituting the retransmission block.

In this case, there may not be code block groups mapped to some bits of the HARQ ACK/NACK message for the transmission block or the HARQ ACK/NACK message for the retransmission block.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set to either NACK bits or ACK bits.

In this case, among the N bits of the HARQ ACK/NACK message for the transmission block or the HARQ ACK/NACK message for the retransmission block, the first K bits may be mapped to different code block groups, and the last (N−K) bits mapped to no code block groups may be set by repeating a configuration pattern of the first K bits.

For example, when the HARQ ACK/NACK message consists of eight bits (i.e., N=8) and the first two bits (i.e., K=2) are set to ACK and NACK, the last six bits (i.e., N−K=8−2=6) may be set to ACK, NACK, ACK, NACK, ACK, and NACK, which is obtained by repeating a pattern of ACK and NACK It is assumed that the HARQ AKC NACK message consists of eight bits (i.e., N=8). Under this assumption, the last seven bits (i.e., N−K=8−1=7) may be set to ACKs when the first bit (i.e., K=1) is set to ACK and may be set to NACKs when the first bit (i.e., K=1) is set to NACK. That is, when K=1, all the bits of the HARQ ACK/NACK message may be set to the same value as the first bit.

In this case, when DL control information for scheduling a DL data channel through which the transmission block or the retransmission block is to be transmitted has a predetermined first DCI format, the last (N−K) bits mapped to no code block groups may be set by repeating a pattern of the first K bits. Also, as another example, each of the number of bits of the HARQ ACK/NACK message for the transmission block and the number of bits of the HARQ ACK/NACK message for the retransmission block may be set to M (here, M is a natural number). In this case, M may be determined as the number of code block groups constituting the transmission block.

That is, in the above-described dynamic codebook mode, the number of bits of the HARQ ACK/NACK message may vary depending on the number of code block groups of the transmission block, but the number of bits of the HARQ ACK/NACK message for the transmission block may be set equal to the number of bits of the HARQ ACK/NACK message for the retransmission block.

According to the methods according to these embodiments, it is possible to signal a control message for a transmission block based on a code block group (CBG) when transmitting and receiving the CBG-based transmission block and to configure a HARQ feedback message for the CBG-based transmission block and a HARQ feedback message for a retransmission block.

Specifications and standards mentioned in the foregoing embodiments are omitted herein to simplify the description of, and constitute part of, the present disclosure. Therefore, it should be understood that part of the specifications and standards can be added to the present disclosure or be specified in the claims within the scope of the present disclosure.

The above description is only illustrative of the technical idea of the present disclosure, and those skilled in the art will appreciate that various modifications, additions and substitutions are possible, without departing from the essential characteristics of the disclosure. Therefore, the embodiments disclosed herein are intended not to limit but to describe the technical spirit of the present disclosure, and the scope of the present disclosure is not limited to the embodiments. The scope of the disclosure should be construed by the appended claims, and all technical sprits within the scope of their equivalents should be construed as included in the scope of the disclosure.

What is claimed is:

1. A method for receiving, by a terminal, a transmission block from a base station, the method comprising:
receiving a transmission block composed of one or more code block groups from the base station;

transmitting a hybrid automatic repeat request (HARQ) acknowledgement/negative-acknowledgement (ACK/NACK) message for the transmission block to the base station;

receiving a retransmission block configured based on the HARQ ACK/NACK message for the transmission block from the base station; and transmitting a HARQ ACK/NACK message for the retransmission block to the base station, wherein when a total number of code blocks forming the transmission block is equal to C and a total number of code block groups forming the transmission block is equal to G, among the G code block groups, (C mod G) code block groups are composed of $\lceil C/G \rceil$ code blocks, and the other (G−(C mod G)) code block groups are composed of $\lfloor C/G \rfloor$ code blocks, where C and G are natural numbers.

2. The method of claim 1,
wherein each of a number of bits of the HARQ ACK/NACK message for the transmission block and a number of bits of the HARQ ACK/NACK message for the retransmission block is set to a fixed value N, and
wherein the value N is received from the base station through high layer signaling.

3. The method of claim 2, wherein a number K of code block groups forming the transmission block or the retransmission block is less than or equal to the value N, where K and N are nature numbers.

4. The method of claim 3, wherein when the value K is less than the value N, last (N−K) bits of the HARQ ACK/NACK message for the transmission block or the HARQ ACK/NACK message for the retransmission block are set to either NACK bits or ACK bits, where K and N are nature numbers.

5. The method of claim 3, wherein when the value K is less than the value N, last (N−K) bits of the HARQ ACK/NACK message for the transmission block or the HARQ ACK/NACK message for the retransmission block are set by repeating a pattern of the first K bits, where K and N are nature numbers.

6. The method of claim 1,
wherein each of a number of bits of the HARQ ACK/NACK message for the transmission block and a number of bits of the HARQ ACK/NACK message for the retransmission block is set to M, and
wherein the value M is determined based on the number of code block groups constituting the transmission block, where M is a natural number.

7. A method for transmitting, by a base station, a transmission block to a terminal, the method comprising:

transmitting a transmission block composed of one or more code block groups to the terminal;

receiving a hybrid automatic repeat request (HARQ) acknowledgement/n negative-acknowledgement (ACK/NACK) message for the transmission block from the terminal;

transmitting a retransmission block configured based on the HARQ ACK/NACK message for the transmission block to the terminal; and receiving a HARQ ACK/NACK message for the retransmission block from the terminal, wherein when a total number of code blocks forming the transmission block is equal to C and a total number of code block groups forming the transmission block is equal to G, among the G code block groups, (C mod G) code block groups are composed of $\lceil C/G \rceil$ code blocks, and the other (G−(C mod G)) code block groups are composed of $\lfloor C/G \rfloor$ code blocks, where C and G are natural number.

8. The method of claim 7,
wherein each of the number of bits of the HARQ ACK/NACK message for the transmission block and the number of bits of the HARQ ACK/NACK message for the retransmission block is set to a fixed value N, and
wherein the value N is transmitted to the terminal through high layer signaling, where N is a natural number.

9. The method of claim 8, wherein a number K of code block groups forming the transmission block or the retransmission block is less than or equal to the value N, where K is a natural number.

10. The method of claim 9, wherein when the value K is less than the value N, last (N−K) bits of the HARQ ACK/NACK message for the transmission block or the HARQ ACK/NACK message for the retransmission block are set to either NACK bits or ACK bits, where N and K are natural numbers.

11. The method of claim 9, wherein when the value K is less than the value N, last (N−K) bits of the HARQ ACK/NACK message for the transmission block or the HARQ ACK/NACK message for the retransmission block are set by repeating a pattern of the first K bits, where N and K are natural numbers.

12. The method of claim 7, wherein each of a number of bits of the HARQ ACK/NACK message for the transmission block and a number of bits of the HARQ ACK/NACK message for the retransmission block is set to M, and the value M is determined based on the number of code block groups constituting the transmission block, where M is a natural number.

13. A terminal for receiving a transmission block from a base station, the terminal comprising:

a receiver configured to receive a transmission block composed of one or more code block groups from the base station and receive a retransmission block configured based on a hybrid automatic repeat request (HARQ) acknowledgement/negative-acknowledgement (ACK/NACK) message for the transmission block from the base station; and a transmitter configured to transmit the HARQ ACK/NACK message for the transmission block to the base station and transmit a HARQ ACK/NACK message for the retransmission block to the base station, wherein when a total number of code blocks forming the transmission block is equal to C and a total number of code block groups forming the transmission block is equal to G, among the G code block groups, (C mod G) code block groups are composed of $\lceil C/G \rceil$ code blocks, and the other (G−(C mod G)) code block groups are composed of $\lfloor C/G \rfloor$ code blocks, where C and G are natural numbers.

14. The terminal of claim 13,
wherein each of a number of bits of the HARQ ACK/NACK message for the transmission block and a number of bits of the HARQ ACK/NACK message for the retransmission block is set to a fixed value N, and
wherein the value N is received from the base station through high layer signaling, where N is a natural number.

15. The terminal of claim 14, wherein a number K of code block groups forming the transmission block or the retransmission block is less than or equal to the value N, where K is a natural number.

16. The terminal of claim 15, wherein when the value K is less than the value N, i) last (N−K) bits of the HARQ ACK/NACK message for the transmission block or the HARQ ACK/NACK message for the retransmission block are set to either NACK bits or ACK bits or ii) the last (N−K) bits of the HARQ ACK/NACK message for the transmission block or the HARQ ACK/NACK message for the retransmission block are set by repeating a pattern of the first K bits, where N and K are natural numbers.

17. The terminal of claim 13, wherein each of the number of bits of the HARQ ACK/NACK message for the transmission block and the number of bits of the HARQ ACK/NACK message for the retransmission block is set to M, and wherein the value M is determined based on the number of code block groups constituting the transmission block, where M is a natural number.

\* \* \* \* \*